US008726183B2

(12) United States Patent
Saito

(10) Patent No.: US 8,726,183 B2

(45) Date of Patent: May 13, 2014

(54) INPUT APPARATUS CONFIGURED TO CHANGE COLOR WHEN A SET VALUE CHANGE EXCEEDS A PREDETERMINED THRESHOLD AND IMAGE FORMING APPARATUS INCORPORATING INPUT APPARATUS

(75) Inventor: Yasushi Saito, Osaka (JP)

(73) Assignee: Kyocera Mita Corporation (JP)

( * ) Notice: Subject to any disclaimer, the term of this patent is extended or adjusted under 35 U.S.C. 154(b) by 541 days.

(21) Appl. No.: 12/909,459

(22) Filed: Oct. 21, 2010

(65) Prior Publication Data

US 2011/0102820 A1 May 5, 2011

(30) Foreign Application Priority Data

Oct. 30, 2009 (JP) ................................ 2009-250192

(51) Int. Cl.

*G06F 3/048* (2013.01)

*G03G 15/00* (2006.01)

(52) U.S. Cl.

USPC .............................. 715/772; 715/823; 399/81

(58) Field of Classification Search

USPC ............................ 715/772, 823, 821; 399/81

See application file for complete search history.

(56) References Cited

U.S. PATENT DOCUMENTS

| | | | | |
|---|---|---|---|---|
| 4,902,878 | A * | 2/1990 | Smith et al. | 219/486 |
| 5,396,235 | A * | 3/1995 | Maeshima et al. | 341/34 |
| 6,104,397 | A * | 8/2000 | Ryan et al. | 715/846 |
| 7,567,679 | B2 * | 7/2009 | Hsieh | 381/109 |
| 7,649,526 | B2 * | 1/2010 | Ording et al. | 345/173 |
| 7,719,698 | B2 * | 5/2010 | Machida et al. | 358/1.1 |
| 2006/0090634 | A1 * | 5/2006 | Pan et al. | 84/743 |

FOREIGN PATENT DOCUMENTS

| | | | |
|---|---|---|---|
| JP | 2577400 | B2 * | 1/1997 |
| JP | 2008-234666 | | 10/2008 |
| JP | 2009-15799 | | 1/2009 |

* cited by examiner

*Primary Examiner* — Kieu Vu

*Assistant Examiner* — Blaine Basom

(74) *Attorney, Agent, or Firm* — Gerald E. Hespos; Michael J. Porco; Matthew T. Hespos

(57) ABSTRACT

An input apparatus configured to change a set value continuously, comprising: an operating key configured to be pressed; a detector configured to detect press of the operation key; a calculation portion configured to sequentially add or subtract a first variable to or from the set value during the press of the operation key and sequentially add or subtract a second variable greater than the first variable to or from the set value after a number of calculations with the first variable exceeds a first threshold number; and a change portion configured to change the operating key in color from a first hue to a second hue, when the number of the calculations with the first variable exceeds a second threshold number smaller than the first threshold number.

8 Claims, 10 Drawing Sheets

INPUT APPARATUS CONFIGURED TO CHANGE COLOR WHEN A SET VALUE CHANGE EXCEEDS A PREDETERMINED THRESHOLD AND IMAGE FORMING APPARATUS INCORPORATING INPUT APPARATUS

BACKGROUND OF THE INVENTION

1. Field of the Invention

The present invention relates to an input apparatus and an image forming apparatus incorporating the input apparatus.

2. Description of the Related Art

An image forming apparatus such as an electronic copying machine or a multi-functional peripheral comprises an input apparatus including operating keys. A user may input desired numerical values (for example, a number of print copies or a print magnification rate) by means of the input apparatus. The image forming apparatus performs image formation processing under various conditions on the basis of the set values input to the input apparatus.

An up key and a down key are known, for example, as operating keys. In general, prescribed increment values and decrement values are allocated to pressing operations of the up key and the down key, respectively. Whenever a user presses the up key or the down key, a set value of the input apparatus changes by the increment value allocated to the up key or by the decrement value allocated to the down key. Therefore, the user may press the up key and/or the down key to make settings in relation to image formation processing.

A particular input apparatus has a sequential change function for sequentially varying set values. If a user continuously presses the up key or the down key for a prescribed time, then a prescribed increment or decrement value allocated to the up key or the down key is sequentially added or subtracted to/from a set value of the input apparatus. The sequential change function contributes to efficient setting operation in relation to image formation processing.

The sequential change function may also be executed by using a few increment or decrement values. If a user continuously presses the up key for a prescribed time, for example, then a first increment value is sequentially added to a set value of the input apparatus. After the first increment value is added for a prescribed period, a second increment value is sequentially added. Typically, a value of "1" is allocated to the first increment value and a value of "10" is allocated to the second increment value. Therefore, even if the set value of the input apparatus is far from a set value desired by the user, the user may quickly make a setting for image formation processing.

Similarly, if the user continuously presses the down key for a prescribed period, for example, then a first decrement value is sequentially subtracted from a set value of the input apparatus. After the subtraction using the first decrement value for a prescribed period, a second decrement value is sequentially subtracted. Typically, a value of "1" is allocated to the first decrement value and a value of "10" is allocated to the second decrement value. Therefore, even if a set value of the input apparatus is far from a set value desired by the user, the user may quickly make a setting for image formation processing.

As described above, the sequential change function starts in accordance with a length of the pressing time of the up key and/or the down key. Therefore, a user who does not want to use the sequential change function has to press the up key or down key for a shorter period. Furthermore, a user who wants to use the sequential change function has to press the up key or down key for a longer period. The key operations dependent on the length of the pressing period may, however, require complicate setting operation of users.

Key operations dependent on the length of the pressing period may be applied not only to the input apparatus of the image forming apparatus but also to a mobile or car navigation system. In a toggle system which is employed in various mobile telephones and car navigation systems, generally, a few letters or numbers are allocated to one operating key. In a particular apparatus using the toggle system, if a user continuously presses an operating key for a longer period to select a letter or number, thereafter the selected letter or number is fixed as input information. Therefore, the user may set the input information without moving his or her finger to another operating key (for example, an enter key) in order to set the selected letter or number.

A particular input apparatus using the toggle system also changes a display in a display unit of a mobile telephone or car navigation system. For example, if a user presses an operating key for a longer period to select a letter or number, thereafter, as described above, a specific coloured mark is displayed on the display unit 0.2 seconds before the selected letter or number is set as input information.

An input apparatus having the sequential change function is more sensitive than an input apparatus using the toggle system described above about pressing a key (for example, an up key and/or a down key) too long. For example, if a user continuously presses an up key for a longer time inadvertently, then a value which greatly exceeds a set value desired by the user may be input.

The display of a mark on an input apparatus using the toggle system described above may notify a user of switching a function achieved by a shorter pressing operation to a function achieved by a longer pressing operation. Displaying the mark may effectively notify the user of starting the sequential change function which an input apparatus owns. This, however, does not address notification of a change in an increment and/or decrement value after starting the sequential change function.

SUMMARY OF THE INVENTION

An object of the present invention is to provide an input apparatus, and an image forming apparatus incorporating the input apparatus, whereby a set value may efficiently and sequentially change in accordance with continuous press of an operating key.

The input apparatus configured to sequentially change a set value according to one aspect of the present invention, includes: an operating key configured to be pressed; a detector configured to detect press of the operation key; a calculation portion configured to sequentially add or subtract a first variable to or from the set value during the press of the operation key and sequentially add or subtract a second variable greater than the first variable to or from the set value after a number of calculations with the first variable exceeds a first threshold number; and a change portion configured to change the operating key in colour from a first hue to a second hue, when the number of the calculations with the first variable exceeds a second threshold number smaller than the first threshold number.

The image forming apparatus relating to another aspect of the present invention is an image forming apparatus including: the input apparatus described above.

DETAILED DESCRIPTION OF THE PREFERRED EMBODIMENTS

Figure 1:
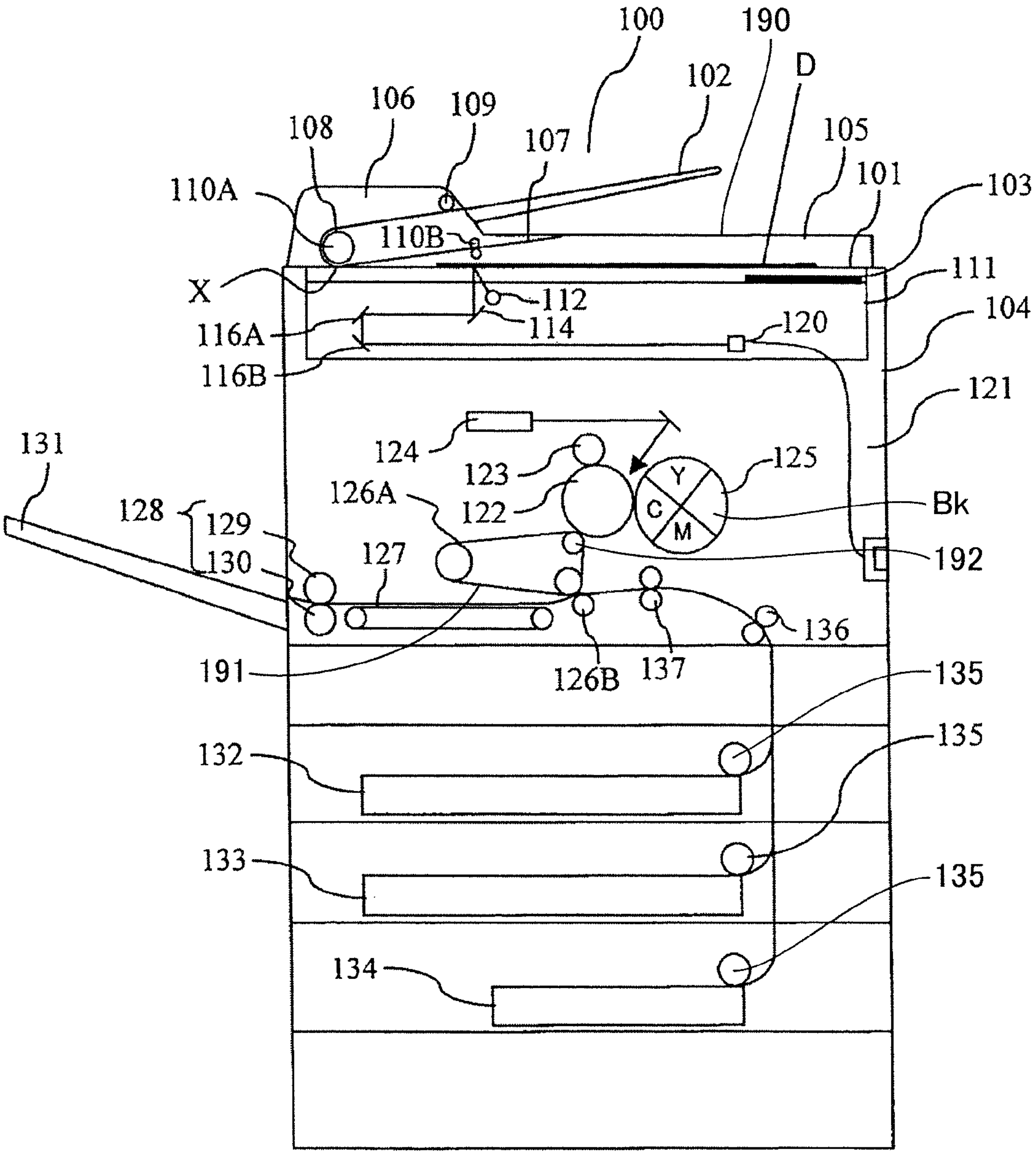
FIG. 1 is a schematic drawing showing a configuration of an image forming apparatus comprising an input apparatus.

The input apparatus and the image forming apparatus according to one embodiment are, hereinafter, described with reference to the accompanying drawings. The terms indicating the directions such as "upper", "lower", "left" and "right", and the like in the following description simply intends to clarify the description and do not limit a principle according to the following disclosure in any way. Furthermore, the description given below and the detailed configuration shown in the drawings exemplify the input apparatus and the image forming apparatus without any limiting intention.

(Image Forming Apparatus Incorporating Input Apparatus)

In the present embodiment, an operating unit is incorporated into a multi-functional peripheral (a complex machine) to be functioned as a printer, a copying machine, a scanner and a facsimile device. A user may use the operating unit incorporated into the multi-functional peripheral to change its functions and/or conditions for image formation. Therefore in the present embodiment, the operating unit of the multi-functional peripheral is exemplified as an input apparatus. Furthermore, in the present embodiment, the multi-functional peripheral is exemplified as an image forming apparatus. However, a printer, a copying machine, a scanner and a facsimile apparatus may also be used as the image forming apparatus.

FIG. 1 shows a schematic view of an internal structure of the multi-functional peripheral. The operation of the multi-functional peripheral for a user to select a copy function of the multi-functional peripheral will now be described with reference to FIG. 1. In order to make the description clearer, an unnecessarily detailed explanation of the structure is not given here and the description centers principally on the structure relating to the input apparatus.

The multi-functional peripheral 100 comprises a housing 104 and a platen cover 105 configured to cover an upper surface of the housing 104. The platen cover 105 is rotatably attached to the housing 104 so that the platen cover 105 vertically rotates with respect to the housing 104. The housing 104 includes a document platform 101. The document platform 101 at least partially forms the upper surface of the housing 104. When the user turns the platen cover 105 upwards, the document platform 101 appears. Thereafter, the user may place a document D on the document platform 101.

The platen cover 105 comprises a base section 190 configured to cover the document platform 101, a loading plate 102 provided on the base section 190 and a feeder 106 built at a connection section between the base section 190 and the loading plate 102. The user may also place a document D on the loading plate 102 instead of the document platform 101. The feeder 106 conveys the document D on the loading plate 102 to the document platform 101. An upper surface of the base section 190 is used as a discharge station 107. After an image of the document D on the document platform 101 is read by the multi-functional peripheral 100, the feeder 106 conveys the document D from the document platform 101 to the discharge station 107.

The feeder 106 includes a conveyance path 108 formed inside the platen cover 105. The conveyance path 108 defines a movement path of the document D from the loading plate 102 to the discharge station 107. The platen cover 105 comprises a pick-up roller 109 and conveyance rollers 110A and 110B. The pick-up roller 109 disposed inside the platen cover 105 supplies the document D to the conveyance path 108. Thereafter the conveyance rollers 110A and 110B disposed inside the platen cover 105 convey the document D along the conveyance path 108.

The multi-functional peripheral 100 comprises an image reader 111. Furthermore, a reading position X is provided in the conveyance path 108. The image reader 111 reads in an image of the document D delivered to the reading position X by the conveyance roller 110A. Thereupon, the document D is conveyed to the discharge station 107 by the conveyance roller 110B.

Unlike the document platform 101, the user may load a stack of documents D on the loading plate 102. The pick-up roller 109 pulls the documents D on the loading plate 102, one after another, into the conveyance path 108. Thereafter, the document D is conveyed via the reading position X to the discharge station 107 as afore-described. At the reading position X, the image reader 111 described above reads in an image of the document D.

Figure 2:
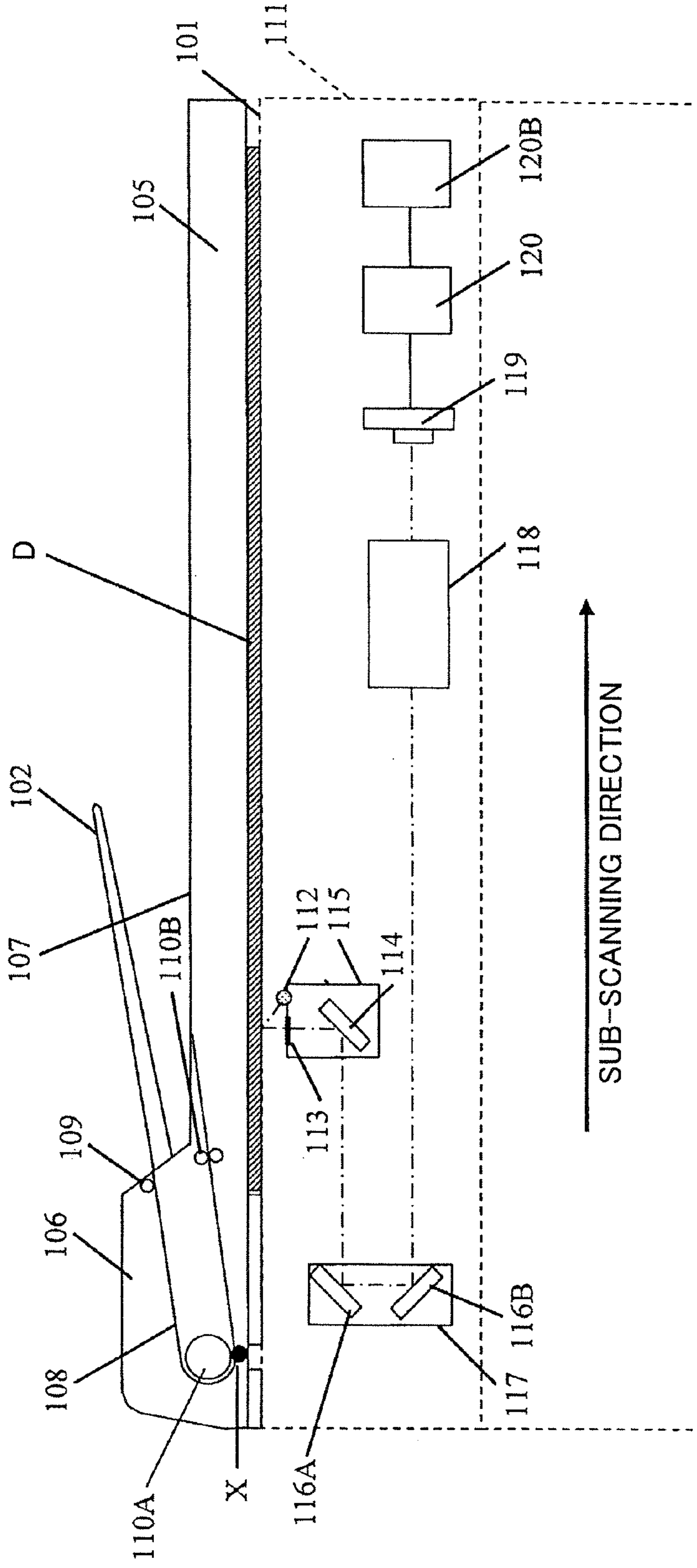
FIG. 2 is a schematic enlarged diagram of an image reader of the image forming apparatus shown in FIG. 1.

FIG. 2 is a schematic enlarged diagram of the image reader 111. Further description of the multi-functional peripheral 100 is given here with reference to FIGS. 1 and 2.

The image reader 111 disposed below the document platform 101 comprises a first carrier 115 and a second carrier 117. The first carrier 115 comprises a light source 112 configured to illuminate the document platform 101. The light source 112 emits a light beam horizontally elongated in a main scanning direction (a direction perpendicular to a sub scanning direction shown in FIG. 2). A slit 113 is formed in the first carrier 115. The slit 113 allows light to selectively pass from the document platform 101. The first carrier 115 has a built-in mirror 114 configured to reflect the light transmitted through the slit 113 towards the second carrier 117.

The image reader 111 houses a lens group 118, an image capture device 119, an image data generation unit 120 and a storage memory 120B. The second carrier 117 comprises mirrors 116A and 116B. The mirror 116A of the second carrier 117 reflects the light from the mirror 114 of the first carrier 115 to the mirror 116B. The mirror 116B then reflects the light from the mirror 116A to the lens group 118.

The lens group 118 optically corrects the light from the second carrier 117. The image capture device 119 receives the light after the correction by the lens group 118 and converts the light into an electrical signal. The image data generation unit 120 generates image data on the basis of the electrical signal from the image capture device 119. The storage memory 120B stores the image data. Optionally the image data generation unit 120 may carry out various signal processing operations such as correction processing, image enhancing processing or compression processing on the electrical signal.

When a user sends a document D to the document platform 101 via the feeder 106, the first carrier 115 moves so that the light source 112 illuminates the reading position X. The document D passing through the reading position X reflects the light transmitted through the document platform 101. The reflected light from the document D is transmitted to the image capture device 119 via the slit 113, the mirrors 114, 116A, 116B and the lens group 118.

As described above, the image capture device 119 converts the reflected light after the optical transmission into an electrical signal, which is then transmitted to the image data generation unit 120. The image capture device 119 divides the reflected light into a red light component, a green light component and a blue light component to output analogue electrical signals corresponding to these. The image data generation unit 120 converts the analogue signals into digital signals (digitalization processing), respectively.

As described above, the light source 112 emits a light beam elongated in the scanning direction while the image data generation unit 120 successively generates a unit data set on the basis of the electrical signals corresponding to scanning lines, respectively. Thereupon, the image data generation unit 120 applies the unit data sets to signal processing such as correction processing, image enhancing processing and compression processing to generate image data corresponding to the image of the document D. Thereupon, the storage memory 120B stores the image data.

If the user places a document D directly on the document platform 101 instead of the feeder 106, the first carrier 115 moves in the sub-scanning direction. The light source 112 emits light while the first carrier 115 moves in the sub-scanning direction. During the movement of the first carrier 115, the second carrier 117 moves toward the image capture device 119 (for example, at one half of the movement speed of the first carrier 115) so as to maintain a constant length of an optical path from the light source 112 to the image capture device 119.

The light from the light source 112 emitted during the movement of the first carrier 115 is reflected by the document D on the document platform 101. Thereupon, the reflected light is transmitted to the image capture device 119 by the mirrors 114, 116A, 116B. The image capture device 119 converts the reflected light to an electrical signal as described above. Thereupon, the image data generation unit 120 generates image data on the basis of the electrical signal. The storage memory 120B stores the image data.

As shown in FIG. 1, the multi-functional peripheral 100 comprises an electrophotographic type of image formation unit 121. The image formation unit 121 disposed below the image reader 111 forms an image on the basis of the image data. In the present embodiment, the image formation unit 121 forms an image on the basis of the image data generated by the image data generation unit 120 as described above. Alternatively, the image formation unit 121 may form an image on the basis of image data sent from a personal computer connected in communication with the multi-functional peripheral 100 (for example, a personal computer connected via a LAN or other networks). Further alternatively, the image formation unit 121 may also form an image on the basis of image data received from another external apparatus via a network interface.

The image formation unit 121 comprises a photosensitive drum 122, a charging device 123 configured to uniformly charge a circumferential surface of the photosensitive drum 122 and an exposure apparatus 124 configured to irradiate laser light onto the charged circumferential surface of the photosensitive drum 122. The exposure apparatus 124 irradiates laser light in accordance with the image data generated by the image data generation unit 120. Consequently an electrostatic latent image corresponding to the image of the document D is formed on the circumferential surface of the photosensitive drum 122. The image formation unit 121 further comprises a rotary developing device 125 configured to supply toner to the circumferential surface of the photosensitive drum 122 after the electrostatic latent image is formed thereon. The developing device 125 includes developing devices 125(Y), 125(C), 125(M) and 125(Bk), which store yellow toner (Y), cyan toner (C), magenta toner (M) and black toner (Bk), respectively. The developing devices 125(Y), 125(C), 125(M) and 125(Bk) rotate in the vicinity of the circumferential surface of the photosensitive drum 122 to supply yellow toner, cyan toner, magenta toner and black toner, respectively, so that a yellow toner image, a cyan toner image, a magenta toner image and a black toner image are formed on the circumferential surface of the photosensitive drum 122.

The image formation unit 121 comprises a transfer unit 191. The transfer unit 191 comprises a transfer belt 126A, a primary transfer roller 192 configured to transfer a toner image from the photosensitive drum 122 to the transfer belt 126A, and a secondary transfer roller 126B configured to transfer the toner image from the transfer belt 126A to a sheet. By means of the primary transfer roller 192, the yellow toner image, the cyan toner image, the magenta toner image and the black toner image are transferred onto the transfer belt 126A. These toner images are mutually superimposed on the transfer belt 126A into a full-colour toner image. Subsequently, the full-colour toner image is transferred from the transfer belt 126A to the sheet by the secondary transfer roller 126B. In the present embodiment, plain paper is used as a sheet. Alternatively, a sheet may be tracing paper, an OHP sheet, a postcard or another sheet-like material onto which a toner image is transferred.

The multi-functional peripheral 100 comprises feed cassettes 132, 133, 134 which are disposed below the image formation unit 121. The feed cassettes 132, 133, 134 are configured to accommodate sheets.

The multi-functional peripheral 100 comprises pick-up rollers 135 which are arranged above the feed cassettes 132, 133, 134, respectively. The pick-up rollers 135 pull out sheets one by one from the corresponding feed cassettes 132, 133, 134, to the transfer unit 191.

The multi-functional peripheral 100 comprises a conveyance roller 136 and a resist roller 137. The conveyance roller 136 conveys the sheet pulled out by the pick-up roller 135 to the resist roller 137. The resist roller 137 conveys the sheet to a nip section between the transfer belt 126A and the secondary transfer roller 126B in synchronism with the image formation processing in the image formation unit 121. As described above, the full-colour toner image is transferred to the sheet between the transfer belt 126A and the secondary transfer roller 126B.

The multi-functional peripheral 100 comprises a fixing unit 128 configured to fix the full-colour toner image onto the sheet, and a conveyance belt 127 disposed between the fixing unit 128 and the secondary transfer roller 126B. The fixing unit 128 comprises a heating roller 129 configured to accommodate a heater, and a pressurization roller 130 configured to be pressed against the heating roller 129. The conveyance belt 127 travels to the nip section between the heating roller 129 and the pressurization roller 130. In the nip section between the heating roller 129 and the pressurization roller 130, thermal energy and pressure energy are applied to the sheet so that the toner image is fixed onto the sheet.

The multi-functional peripheral 100 comprises a discharge tray 131 projecting outwards from the housing 104. After the fixation of the toner image, the sheet is delivered to the discharge tray 131.

As described above, the multi-functional peripheral 100 comprises an operating unit 103. In the present embodiment, the operating unit 103 is provided on an upper surface of the housing 104. The user may operate the operating unit 103 to cause the multi-functional peripheral 100 to be operated as described above. After setting a document D on the document platform 101 or the loading plate 102, the user may instruct initiation of the copying operation described above via the operating unit 103. In the present embodiment, the operating unit 103 comprises operating keys configured to instruct a number of copies or copying magnification rate, for example. The multi-functional peripheral 100 executes the copying operation described above under the copying conditions such as a number of copies or copying magnification rate instructed by means of the operation performed on the operating keys.

Figure 3:
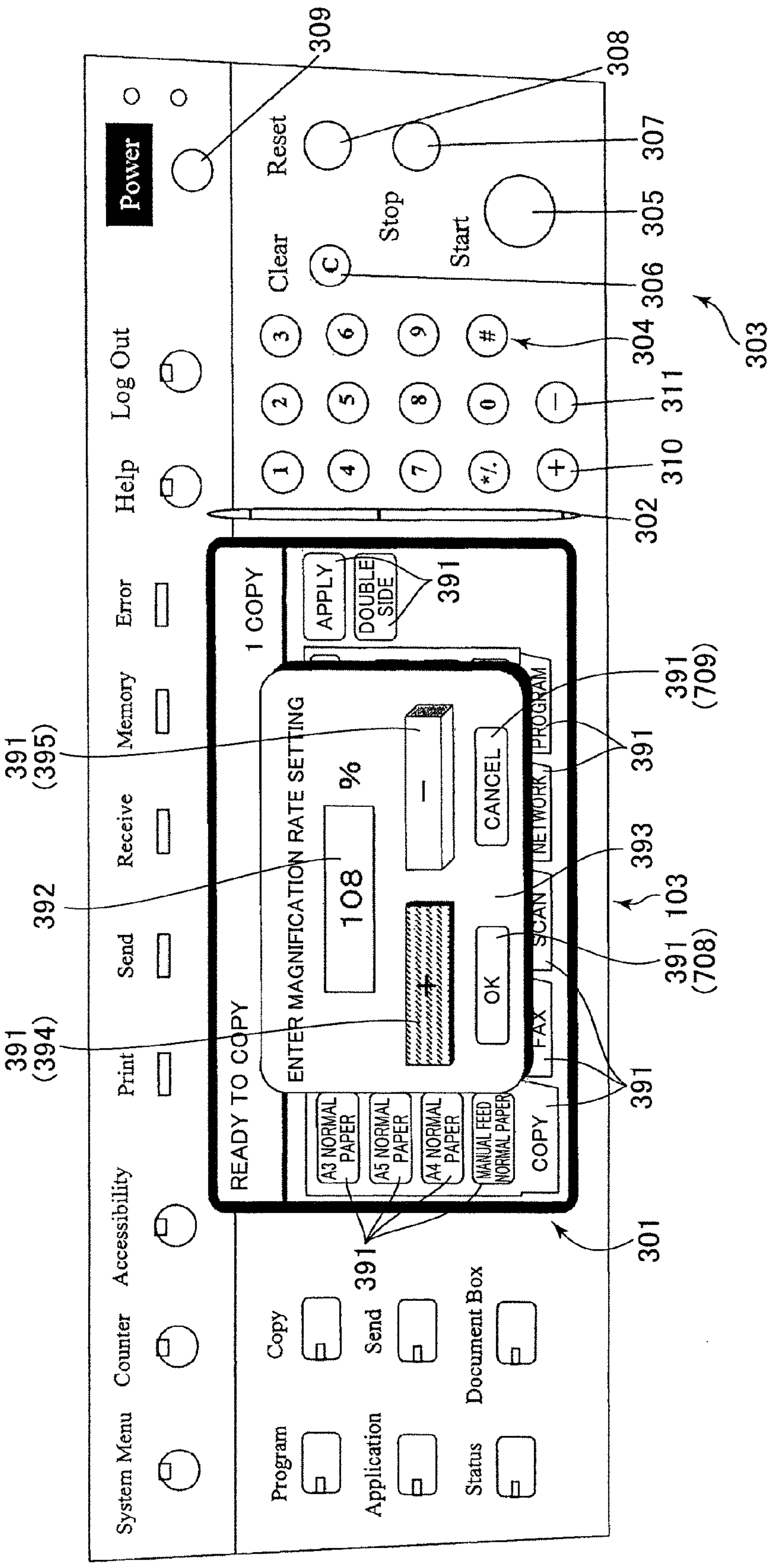
FIG. 3 is a schematic plan diagram of the operating unit of the image forming apparatus shown in FIG. 1.

FIG. 3 shows a schematic diagram of the operating unit 103. The operating unit 103 is described with reference to FIGS. 1 and 3.

As described above, the user operates the operating unit 103 to cause behaviour of the multi-functional peripheral 100. The operating unit 103 comprises a touch panel 301, a touch pen 302 and hardware keys 303. The user may press the hardware keys 303 to input image formation conditions (for example, number of copies, copy magnification rate or copy density). Alternatively, the user may press the touch panel 301 with the touch pen 302 or his/her finger to input image formation conditions (for example, number of copies, copy magnification rate or copy density). The touch panel 301 displays the input image formation conditions. The user may confirm the input image formation conditions via the touch panel 301.

The touch panel 301 displays software keys 391 configured to input the image formation conditions described above and a display window 392 configured to display the numerical values input by means of the software keys 391 and/or the hardware keys 303. Different functions or conditions are allocated to the software keys 391, respectively. The user may press the software key 391 to input a function or a condition associated with the software key 391, to the multi-functional peripheral 100.

As shown in FIG. 3, when the user presses the software key 391 associated with magnification rate setting, the touch panel 301 displays a pop-up image 393 for magnification rate setting. The software keys 391 include an up key 394 and a down key 395 which are displayed inside the pop-up image 393. The display window 392 described above is displayed inside the pop-up image 393. If the user presses the up key 394, then the operating unit 103 adds a prescribed variable to the current set value (or the default value) displayed in the display window 392. If the user presses the down key 395, then the operating unit 103 subtracts a prescribed variable from the current set value displayed in the display window 392. When the magnification rate displayed in the display window 392 is equivalent to a desired value by means of the operation of the up key 394 and/or the down key 395, then the user may press the software key 391 marked with the text "OK" in the pop-up image 393 to set the input numerical value. Thereupon, the touch panel 301 deletes the pop-up image 393. The user may subsequently set another image formation condition (for example, a condition relating to density or a condition relating to a number of copies). Alternatively, the user presses a software key 391 marked with the text "Cancel" in the pop-up image 393 to erase the pop-up image 393. In the present embodiment, the software keys 391 and/or the hardware keys 303 is exemplified as operating keys.

If the user presses the software key 391, then the touch panel 301 changes the colour of the corresponding software key 391. In the present embodiment, the pressed software key 391 changes in colour from white to yellow (or gray). The user may recognize press of the software key 391 on the basis of the colour of the software key 391.

Preferably, the user operates the touch panel 301 using the touch pen 302. The operating unit 103 comprises the touch panel 301 and a sensor configured to detect contact with a tip of the touch pen 302. The sharp tip of the touch pen 302 allows the sensor to detect a contact position of the tip of the touch pen 302 as a dot unit (minimum unit). Consequently, the user may operate the touch panel 301 more reliably using the touch pen 302 than if operating the touch panel 301 with his or her finger. Therefore, using the touch pen 302, the user may accurately select and press the up key 394, the down key 395 and/or other software keys 391.

The hardware keys 303 provided beside the touch panel 301 include a keypad 304, a start key 305, a clear key 306, a stop key 307, a reset key 308, a power key 309, an up key 310 and a down key 311.

The user may use the keypad 304 to directly input a numerical value for setting an image formation condition (for example, a magnification rate, density, number of copies). Alternatively, the user may also use the up key 310 and/or the down key 311 to input numerical values for setting image formation conditions. The up key 310 has a similar function to the up key 394 displayed in the pop-up image 393 described above. The down key 311 has a similar function to the down key 395 displayed in the pop-up image 393 described above. Therefore, the user may press the up key 310 to add a prescribed variable to a numerical value (current set value) displayed on the touch panel 301. Alternatively, the user may press the down key 311 to subtract a prescribed variable from a numerical value (current set value) displayed on the touch panel 301.

In the present embodiment, the up key 310 and/or the down key 311 comprise a semi-transparent shell and a light source inside the shell. The user may press the shell to operate the up key 310 and/or the down key 311. If the user continuously presses the shell for a prescribed period, then the light source inside the shell emits red light, for example.

Figure 4:
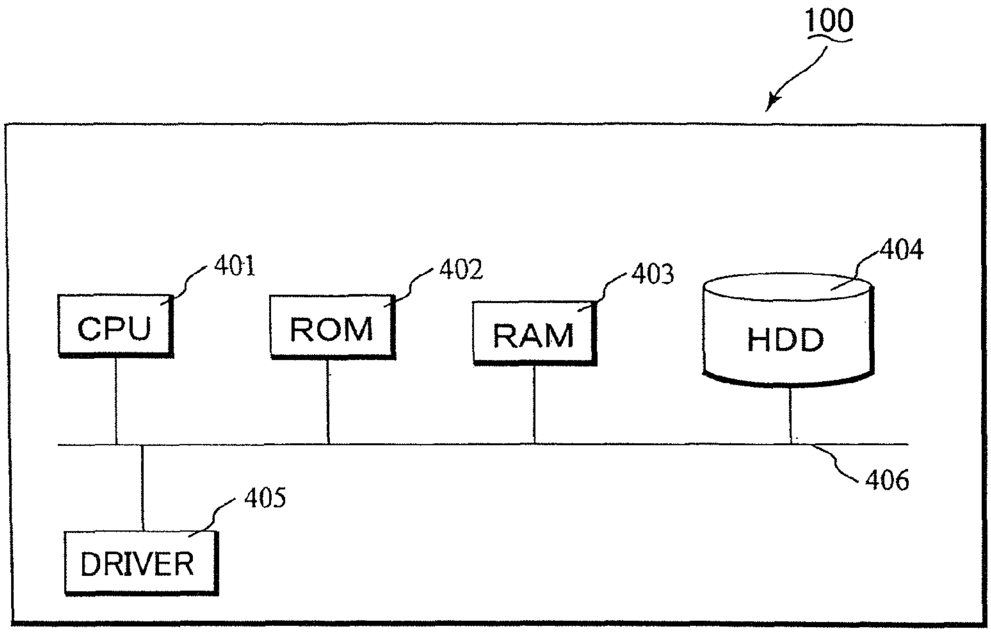
FIG. 4 is a schematic block diagram showing a hardware configuration of a control circuit of the image forming apparatus shown in FIG. 1.

FIG. 4 is a block diagram showing a schematic view of the hardware configuration of a control circuit configured to entirely control the multi-functional peripheral 100. Further description of the multi-functional peripheral 100 is given here with reference to FIGS. 1 to 4. In order to make the description clearer, an unnecessarily detailed explanation of the configuration is not given here and the description centers on the structure relating to the input apparatus.

The control circuit of the multi-functional peripheral 100 comprises a CPU (Central Processing Unit) 401, a ROM (Read Only Memory) 402, a RAM (Random Access Memory) 403, a HDD (Hard Disk Drive) 404, drivers 405 configured to drive the elements described in the context of FIG. 1, respectively; and an internal bus 406 configured to connect together the CPU 401, the ROM 402, the RAM 403, the HDD 404 and the driver 405. The CPU 401 uses the RAM 403 as an operation domain, for example, to execute a program stored in the ROM 402 and/or the HDD 404. The CPU 401 then controls communication of data and instructions from a user between the driver 405 and the operating unit 103 as described with reference to FIG. 3 on the basis of program execution results. Consequently, the operation of the multi-functional peripheral 100 described in the context of FIGS. 1 and 2 is achieved. Various elements described below operate under the control of the CPU 401, respectively. Furthermore, the ROM 402 and/or the HDD 404 stores programs and/or data for operating the elements described below, respectively.

(Operating Unit)

The operation of the operating unit 103 is described here with reference to FIG. 3.

In the present embodiment, if a user continuously presses the up keys 310, 394 for a prescribed period, the touch panel 301 sequentially adds an increment value “1” to the set value. If the user further continues to press the up keys 310, 394 for a prescribed period, the touch panel 301 sequentially adds an increment value “10” to the set value. If the user continues yet further to press the up keys 310, 391 for a prescribed period, the touch panel 301 sequentially adds an increment value “100” to the set value.

If the user continuously presses the down keys 311, 395 for a prescribed period, the touch panel 301 sequentially subtracts a decrement value “1” from the set value. If the user further continues to press the down keys 311, 395 for a prescribed period, the touch panel 301 sequentially subtracts a decrement value “10” from the set value. If the user continues yet further to press the down keys 311, 395 for a prescribed period, the touch panel 301 continuously subtracts a decrement value “100” from the set value.

In the present embodiment, the increment value and/or the decrement value of “1” is exemplified as a first variable. In this case, the increment value and decrement value of “10” and/or the increment value and decrement value of “100” are exemplified as a second variable. Furthermore, the “ones place” of the number displayed in the display window 392 is exemplified as a first digit and the “tens place” and/or “hundreds place” of the number is exemplified as a second digit.

Alternatively, the increment value and/or the decrement value of “10” may be exemplified as the first variable. In this case, the increment value or decrement value of “100” is exemplified as the second variable. Furthermore, the “tens place” of the number displayed in the display window 392 is exemplified as the first digit and the “hundreds place” is exemplified as the second digit.

In the present embodiment, the user may continuously press the up keys 310, 394 and/or the down keys 311, 395 to quickly input a desired set value to the operating unit 103.

Figure 5:
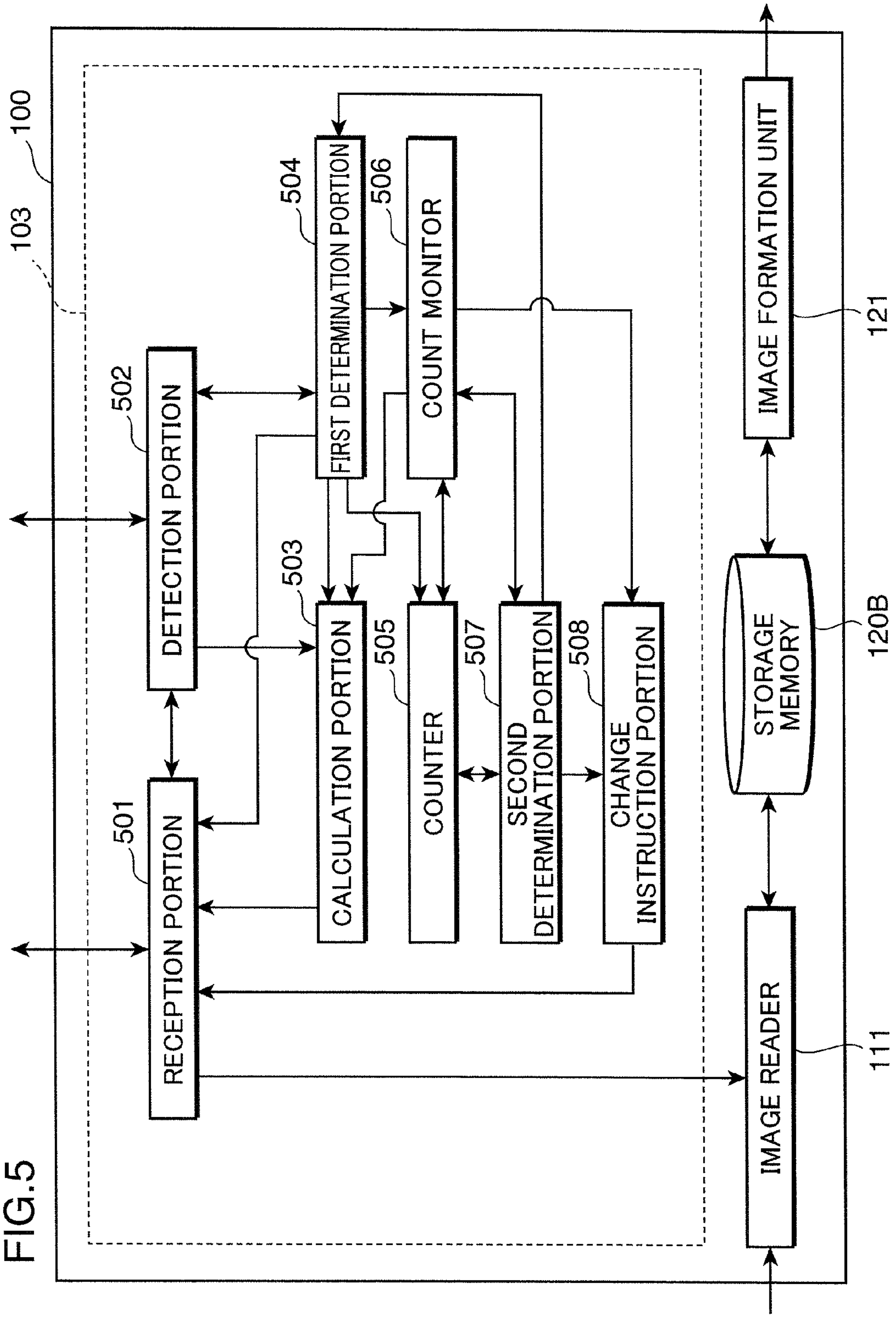
FIG. 5 is a block diagram showing a schematic diagram of a hardware configuration of a control circuit of the image forming apparatus shown in FIG. 3.
Figure 6:
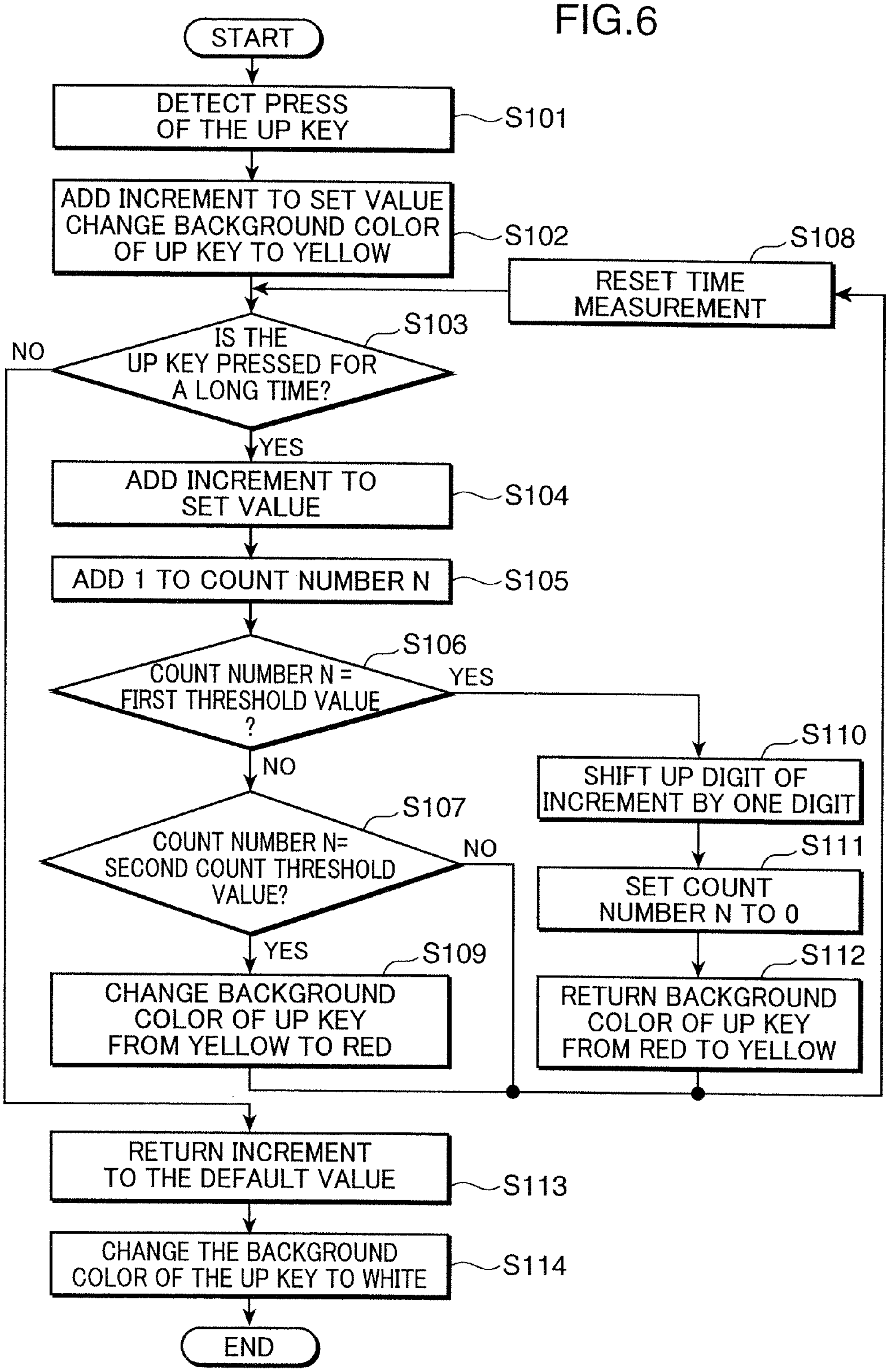
FIG. 6 is a schematic block diagram showing operation of the operating unit shown in FIG. 3.
Figure 7A:
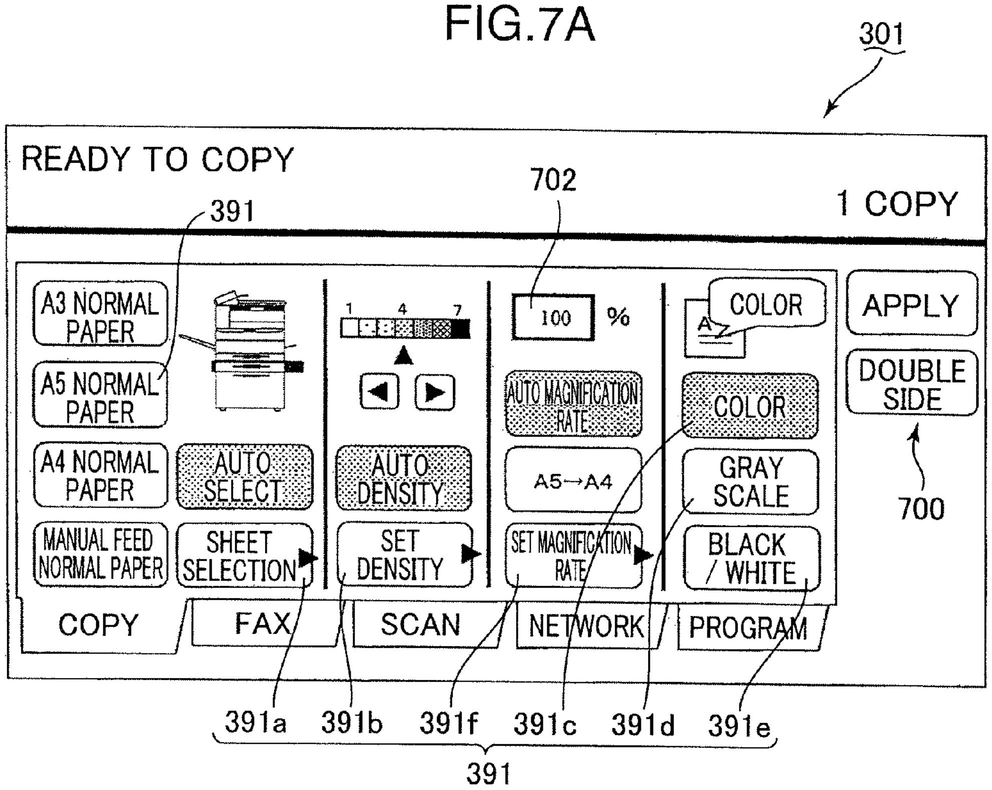
FIG. 7A is a schematic plan diagram of a touch panel of the operating unit shown in FIG. 3.
Figure 7B:
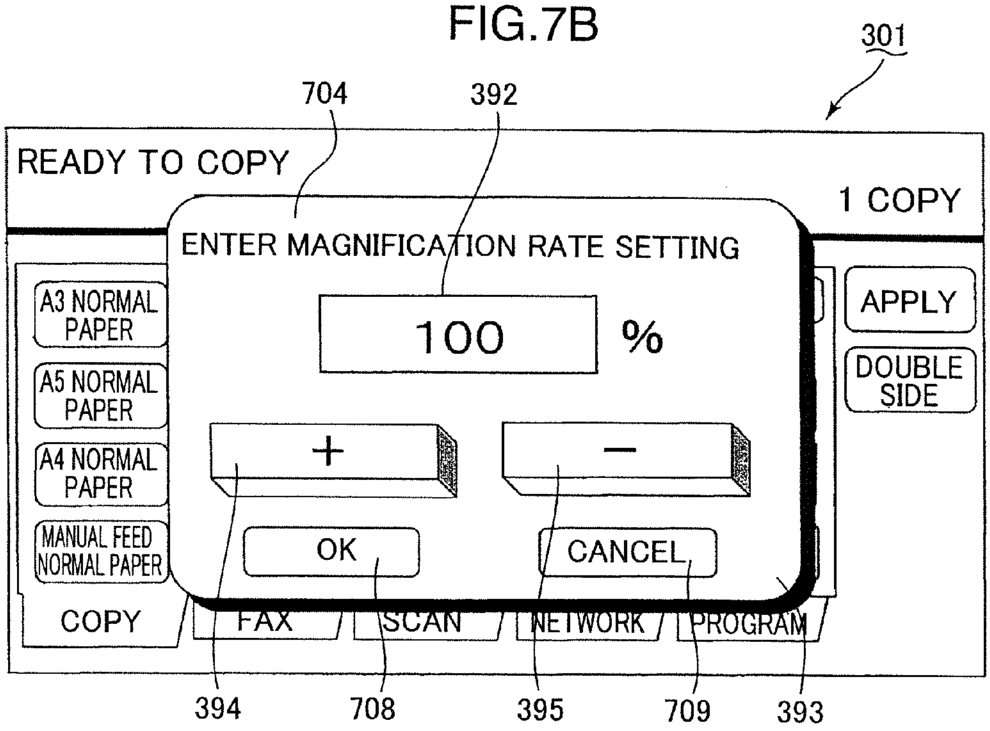
FIG. 7B is a plan diagram showing a schematic view of a subsequent display screen of the touch panel shown in FIG. 7A.

FIG. 5 is a schematic block diagram showing elements (functional components) configured to operate under the control of the CPU 401 described in the context of FIG. 4, respectively. FIG. 6 is a flowchart showing a schematic view of operation of the operating unit 103. FIG. 7A shows a copy settings screen (initial screen) displayed on the touch panel 301. FIG. 7B shows a copy settings screen displayed on the touch panel 301 after the initial screen shown in FIG. 7A. The operation of the operating unit 103 is now described further with reference to FIG. 1, and FIGS. 3 to 7B.

As shown in FIG. 6, the operating unit 103 of the multi-functional peripheral 100 comprises a reception portion 501. As described in the context of FIG. 1, the user places a document D on the document platform 101. Thereupon, if the user operates a power source key 309 (see FIG. 3) of the operating unit 103 to switch on power to the multi-functional peripheral 100, the reception portion 501 displays an initial screen 700 on the touch panel 301 (see FIG. 7A).

The touch panel 301 displays various software keys 391 on the initial screen 700. The user may push the software keys 391 on the initial screen 700 to set image formation conditions. FIG. 7A shows the software keys 391 such as a sheet selection key 391*a* for selecting and specifying a sheet on which an image formation process is to be carried out, a density setting key 391*b* for setting density of toner, a colour selection key 391*c* for selecting colour printing, a gray scale selection key 391*d* for selecting gray scale printing, a monochrome selection key 391*e* for selecting monochrome printing, a magnification rate setting key 391*f* for setting magnification rate of the image to be formed, and other software keys 391 for setting functions and operations provided by a typical image forming apparatus. The sheet selection key 391*a*, the density setting key 391*b*, the colour selection key 391*c*, the gray scale selection key 391*d*, the monochrome selection key 391*e* and the magnification rate setting key 391*f* are displayed according to the initial conditions set in the reception portion 501. The touch panel 301 displays, above the magnification rate setting key 391*f*, a display window 702 for allowing the user to confirm or be notified the set magnification rate. In FIG. 7A, the value “100%” is displayed in the display window 702 as a default value.

In the description given below, the user performs input operations in order to increase the magnification rate from “100%” to “200%”. The user firstly presses the magnification rate setting key 391*f*. The reception portion 501 causes a pop-up image 393 to be displayed on the touch panel 301 in accordance with the press of the magnification rate setting key 391*f*.

The pop-up image 393 displayed on the initial screen 700 shows a message 704 for notifying the user of the fact that the user may set the magnification rate via the pop-up image 393 (in FIG. 7B, the text “input magnification rate setting” is displayed as a message 704). Furthermore, as described in the context of FIG. 3, the pop-up image 393 displays a display window 392 for displaying the input magnification rate (current magnification), an up key 394 for increasing the magnification rate, a down key 395 for decreasing the magnification rate, an OK key 708 for fixing the magnification rate setting as the magnification rate displayed in the display window 392, and a cancel key 709 for cancelling the pop-up image 393.

In the present embodiment, if the user presses the up key 394 for a shorter period, the numerical value (magnification rate) displayed in the display window 392 is incremented by “1”. Furthermore, if the user presses the down key 395 for a shorter period, the numerical value (magnification rate) displayed in the display window 392 is decremented by “1”.

When the pop-up image 393 is displayed, the numerical value (magnification rate) displayed in the display window 392 of the pop-up image 393 corresponds to the numerical value in the display window 702 described in the context of FIGS. 7A and 7B. Consequently, when the user operates the initial screen 700 to display the pop-up image 393, the numerical value “100” is shown in the display window 392 of the pop-up image 393. The user may operate the up key 394 and/or the down key 395 to increase or decrease the magnification rate from a rate of "100%". As described in the context of FIG. 3, the up key 394 and/or the down key 395 are displayed in white before being pressed. When the user presses the up key 394 and/or the down key 395, then the up key 394 and/or the down key 395 is displayed in yellow (or gray).

As shown in FIG. 5, the operating unit 103 comprises a detection portion 502 and a calculation portion 503. In a step S101 in FIG. 6, the detection portion 502 detects that the up key 394 (or the down key 395) is pressed. The detection portion 502 also outputs a pressing signal to indicate the press of the up key 394 (or the down key 395), to the calculation portion 503 and the reception portion 501.

In a step S102, the calculation portion 503 after receiving the pressing signal from the detection portion 502 outputs a magnification rate signal to the reception portion 501. If the user presses the up key 394, then the calculation portion 503 adds "1%" to the magnification rate "100%" displayed in the display window 392, so that a magnification rate signal indicating the magnification rate "101%" is output to the reception portion 501 (if the user presses the down key 395, then the calculation portion 503 subtracts "1%" from the magnification rate "100%" displayed in the display window 392, so that a magnification rate signal indicating the magnification rate "99%" is output to the reception portion 501).

In the step S102, the reception portion 501 after receiving the pressing signal from the detection portion 502 changes the colour of the up key 394 (or down key 395) from "white" to "yellow". When the pressing signal indicates that the up key 394 is pressed, then the reception portion 501 changes the colour of the up key 394 from "white" to "yellow" (and if the pressing signal indicates that the down key 395 is pressed, then the reception portion 501 changes the colour of the down key 395 from "white" to "yellow"). In the present embodiment, the reception portion 501 is exemplified as a change portion.

The reception portion 501 after receiving the magnification rate signal from the calculation portion 503 changes the numerical value displayed in the display window 392. If the magnification rate is indicated as "101%", then the reception portion 501 changes the numerical value in the display window 392 from "100" to "101" (and if the magnification rate is indicated as "99%", then the reception portion 501 changes the numerical value in the display window 392 from "100" to "99").

Figure 8:
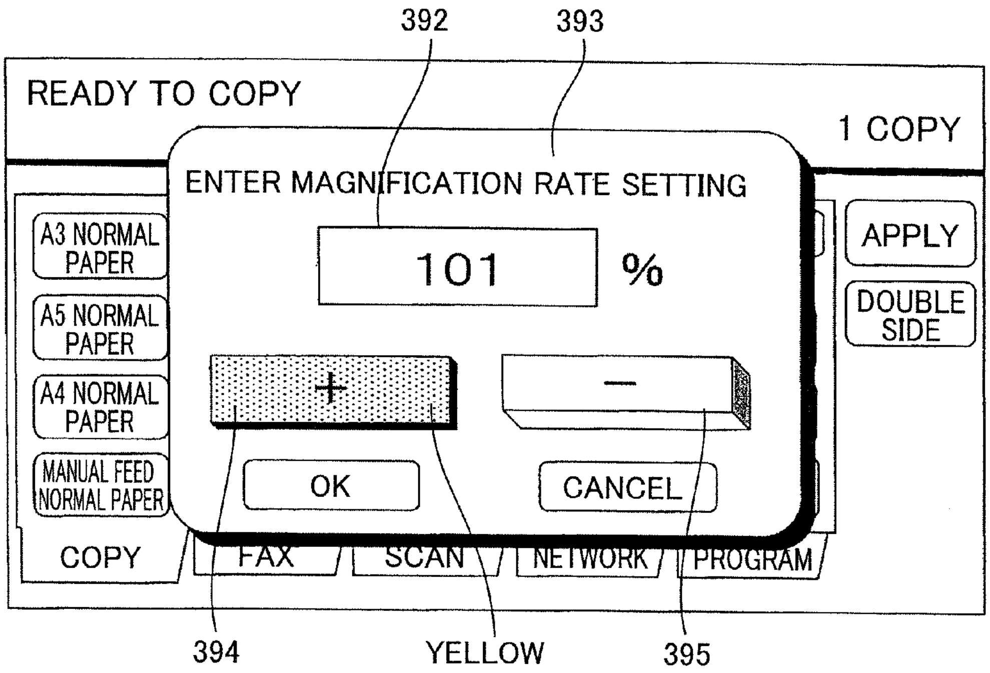
FIG. 8 is a plan diagram showing a schematic view of a subsequent display screen of the touch panel shown in FIG. 7B.

FIG. 8 shows the pop-up image 393 which includes a display window 392 showing the increased magnification rate by "1%" resulting from the press of the up key 394. The operation of the operating unit 103 is described further here with respect to FIGS. 4 to 8.

When the colour of the up key 394 changes due to the press of the up key 394 as described above, the magnification rate indicated in the display window 392 changes from "100%" to "101%". In FIG. 8, the hatching applied to the up key 394 indicates that the colour of the up key 394 is changed from "white" to "yellow". Due to the colour change of the up key 394 from "white" to "yellow", the user may recognize that a function to increase magnification rate is activated by the up key 394.

As shown in FIG. 5, the operating unit 103 comprises a first determination portion 504. The first determination portion 504 comprises a timekeeper element such as a timer, and a memory element (for example, a ROM 402, RAM 403 or HDD 404 as described in the context of FIG. 4) configured to store threshold values corresponding to the time measured by the timekeeper element. The detection portion 502 outputs the pressing signal described above to the first determination portion 504 as well as to the reception portion 501 and the calculation portion 503. The first determination portion 504 uses the timekeeper element to calculate an elapsed time from the press of the up key 394 (or down key 395) on the basis of the pressing signal from the detection portion 502. In the present embodiment, the detection portion 502 and the first determination portion 504 which detect the press of the up key 394 (or down key 395) and the duration of the press are exemplified as a detector.

As indicated in a step S103 in FIG. 6, the first determination portion 504 compares the measured elapsed time with the threshold value stored in the memory element. If the measured elapsed time exceeds the threshold value, then a step S104 is executed. Furthermore, if the user releases the up key 394 (or the down key 395) before the measured elapsed time exceed the threshold value, then a step S113 is executed.

If the measured elapsed time exceeds the threshold value, then the first determination portion 504 outputs an excess signal indicating that the user has pressed the up key 394 (or down key 395) for a longer period than the time period specified by the threshold value, to the calculation portion 503. The threshold value corresponding to the time measured by the timekeeper element may be set to 100 ms, for example.

As indicated in the step S104 in FIG. 6, the calculation portion 503 adds a further "1%" to the current set value "101%" displayed in the display window 392, on the basis of the excess signal from the first determination portion 504. Thereupon, the calculation portion 503 outputs a magnification rate signal indicating the magnification rate "102%", to the reception portion 501. The reception portion 501 changes the set value displayed in the display window 392 from "101%" to "102%", on the basis of the magnification rate signal from the calculation portion 503.

As shown in FIG. 5, the operating unit 103 comprises a counter 505. In the step S103 in FIG. 6, the first determination portion 504 also outputs the excess signal described above to the counter 505 as well as to the calculation portion 503. In a step S105 in FIG. 6, the counter 505 counts the number of calculations performed by the calculation portion 503 on the basis of the excess signal. For example, if the calculation portion 503 adds "1%" to the current set value "101%" on the basis of the excess signal as described above, then "1 time" is added to the default value "0 times" which correspond to a count number N.

As shown in FIG. 5, the operating unit 103 comprises a count monitor 506 configured to monitor the count number N of the counter 505. The count monitor 506 comprises a memory element configured to store a first count threshold value corresponding to the count number N of the counter 505 (for example, the ROM 402, RAM 403 or HDD 404 described in the context of FIG. 4).

In a step S106 in FIG. 6, the count monitor 506 compares the first count threshold value with the count number N of the counter 505. If the count number N of the counter 505 is equal to the first count threshold value, then a step S110 is executed. If the count number N of the counter 505 is different from the first count threshold value, then a step S107 is executed. In the present embodiment, the count number N specified by the first count threshold value is exemplified as a first threshold number. Furthermore, in the present embodiment, the first count threshold value is set to a value of "9". Alternatively, the first count threshold value may be another value.

As shown in FIG. 5, the operating unit 103 comprises a second determination portion 507. Similarly to the count monitor 506, the second determination portion 507 monitors the count number N of the counter 505. The second determination portion 507 comprises a memory element configured to store a second count threshold value corresponding to the count number N of the counter 505 (for example, the ROM 402, RAM 403 or HDD 404 described in the context of FIG. 4). The second count threshold value is set to a value smaller than the first threshold value. In the present embodiment, the second count threshold value is set to a value of "7". Alternatively, the second count threshold value may be set to another value smaller than the first count threshold value. In the present embodiment, the count number N specified by the second count threshold value is exemplified as a second threshold number.

In the step S107 in FIG. 6, the second determination portion 507 compares the second count threshold value with the count number N of the counter 505. If the count number N of the counter 505 is equal to the second count threshold value, then a step S109 is executed. If the count number N of the counter 505 is different from the second count threshold value, then a step S108 is executed.

In the step S107 in FIG. 6, if the second determination portion 507 determines that the count number N of the counter 505 is different from the second count threshold value (in other words, if the count number N of the counter 505 is less than the second count threshold value), then the step S108 is executed. In the step S108, the second determination portion 507 sends a reset signal to the first determination portion 504. The first determination portion 504 resets the measurement value of the timer on the basis of the reset signal. Thereafter, the timer measures the elapsed time after the reset of the measurement value.

As described above, in the present embodiment, the second count threshold value is set to a value of "7". Consequently, a processing routine of repeating the step S103, the step S104, the step S105, the step S106, the step S107 and the step S108 is executed until the counter 505 counts 7 times of the calculation performed by the calculation portion 503 in the step S105 in FIG. 6 on the basis of the excess signal.

As shown in FIG. 5, the operating unit 103 comprises a change instruction portion 508. In the step S105 in FIG. 6, if the counter 505 counts 7 times of the calculation performed by the calculation portion 503 on the basis of the excess signal, then the second determination portion 507 outputs a trigger signal to the change instruction portion 508 in the step S107 in FIG. 6.

In the step S109 in FIG. 6, the change instruction portion 508 outputs a change instruction signal for instructing to change the colour of the up key 394 (or the down key 395), to the reception portion 501, on the basis of the trigger signal from the second determination portion 507. The reception portion 501 changes the colour of the up key 394 (or the down key 395) from "yellow" to "red", on the basis of the change instruction signal. In the present embodiment, the "yellow" colour used as the background colour of the up key 394 (or the down key 395) is exemplified as a first hue. Furthermore, the "red" colour used as the background colour of the up key 394 (or the down key 395) is exemplified as a second hue.

Figure 9:
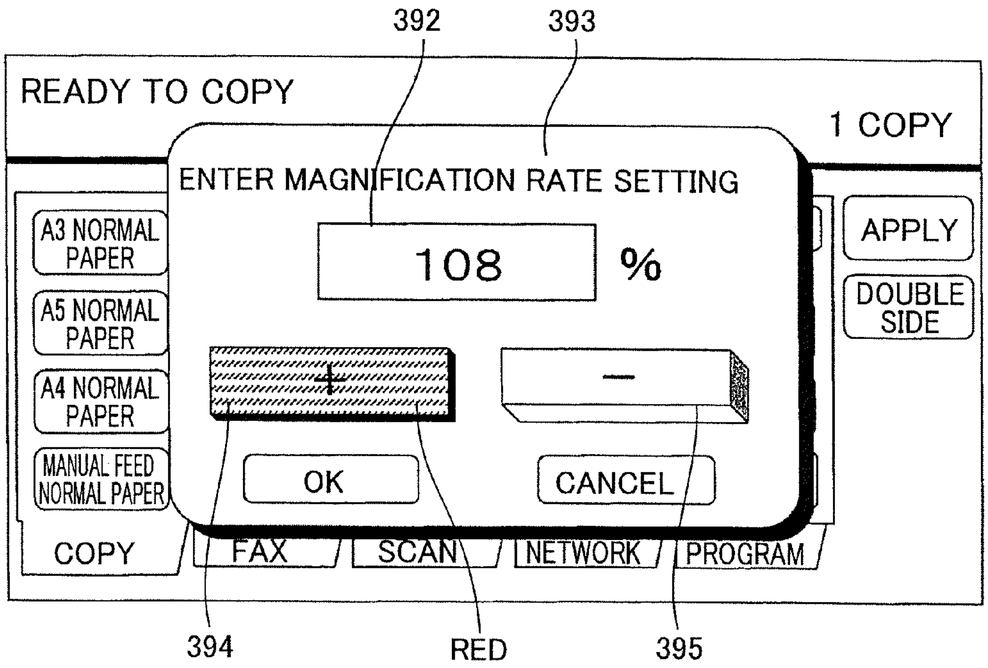
FIG. 9 is a plan diagram showing a schematic view of a subsequent display screen of the touch panel shown in FIG. 8.

FIG. 9 shows a pop-up image 393 of a case where the user continuously presses the up key 394 until the colour of the up key 394 is changed to a red. The operation of the operating unit 103 is described further here with reference to FIG. 5, FIG. 6, FIG. 8 and FIG. 9.

As described above, if the routine specified in the step S103 to the step S108 is repeated seven times, then the calculation portion 503 adds "1%" to a magnification rate of "107%". As a result, a magnification rate of "108%" is displayed in the display window 392 of the pop-up image 393. In this case, the counter 505 adds "1 time" to the count number N of "6 times". In the step S106 in FIG. 6, the count monitor 506 determines that the count number N of the counter 505 does not match the first count threshold value. As a result of this, the step S107 is executed. In the step S107, the second determination portion 507 determines that the count number N of the counter 505 matches the second count threshold value. As a result of this, the colour of the up key 394 is changed to "red". In the present embodiment, if the count number N reaches "7 times", then the colour of the up key 394 (or the down key 395) is changed. Alternatively, the second count threshold value may be set so that the colour of the up key 394 (or the down key 395) changes when a time ranged between 70% and 90% of the threshold value time from the press of the up key 394 (or the down key 395) by user to the initiation of the calculation with an increment value or decrement value of "10%" by the calculation portion 503 is elapsed.

If the routine specified in the step S103 to the step S108 is repeated a further two times (in other words, if the routine is repeated "9 times" in total), then at the step S106, the count monitor 506 determines that the count number N of the counter 505 matches the first count threshold value. Thereupon, the count monitor 506 outputs, to the calculation portion 503, an increase signal for increasing the increment value (or the decrement value) to be used to calculate (increase or decrease) the magnification rate, from "1" to "10".

In the step S110 in FIG. 6, the calculation portion 503 calculates the magnification rate using the increment value (or decrement value) of "10%".

As aforementioned, the second count threshold value is set to be smaller than the first count threshold value. Consequently, before starting a calculation using a larger increment value (or decrement value), the colour of the up key 394 (or the down key 395) is changed. Therefore, the user may recognize that the start of the calculation using a larger increment value (or decrement value) comes soon.

Figure 10:
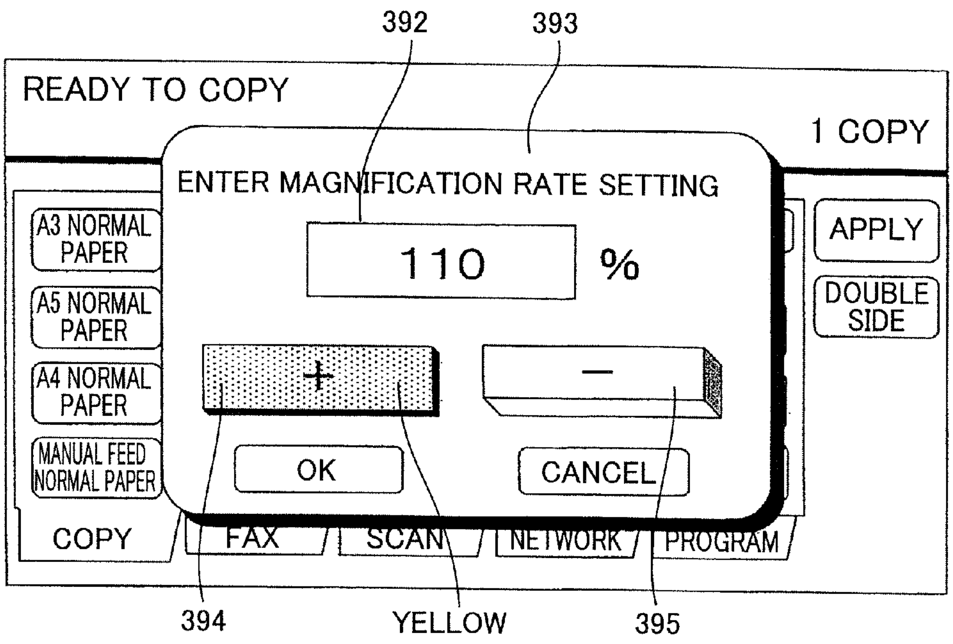
FIG. 10 is a plan diagram showing a schematic view of a subsequent display screen of the touch panel shown in FIG. 9.

FIG. 10 shows the pop-up image 393 in a case where the user continuously presses the up key 394 until the calculation using the larger increment value starts. The operation of the operating unit 103 is described further here with reference to FIG. 5, FIG. 6, FIG. 9 and FIG. 10.

As described above, if the routine specified in the step S103 to the step S108 is repeated nine times, then the calculation portion 503 adds "1%" to a magnification rate of "109%". As a result, a magnification rate of "110%" is displayed in the display window 392 of the pop-up image 393. In this case, the counter 505 adds "1 time" to the count number N of "8 times". In the step S106 in FIG. 6, the count monitor 506 determines that the count number N of the counter 505 matches the first count threshold value. As a result of this, the step S110 is executed.

In the step S110 in FIG. 6, the count monitor 506 outputs a notification signal to the calculation portion 503 to notify the calculation portion 503 that the count number N of the counter 505 matches the first count threshold value. The calculation portion 503 changes the increment value (or the decrement value) to be used thereafter from "1%" to "10%", on the basis of the notification signal from the count monitor 506. As a result of this, the step S111 is executed.

In the subsequent routine specified in the steps S103 to the S108, the calculation portion 503 adds the newly changed increment value "10%" to the current set value "110%", and outputs a magnification rate signal indicating a magnification rate of "120%" to the reception portion 501. The reception portion 501 causes the magnification rate "120%" to be displayed in the display window 392, on the basis of the magnification rate signal from the calculation portion 503.

In a step S111 in FIG. 6, the count monitor 506 sends a reset signal to the counter 505. The counter 505 resets or returns the count number N to a default value (in other words, "0 times") on the basis of the reset signal from the count monitor 506. As a result of this, the count number N held by the counter 505 is changed from "9 times" to "0 times".

After the count number N is reset, if the user continues to press the up key 394 (or the down key 395), then the routine specified in the step S103 to the step S108 is repeated again. The counter 505 progressively increases the count number N, by "1", from the default value (in other words, "0 times"), whenever the routine specified in the step S103 to the step S108 is executed. A similar process to the process before the calculation portion 503 increases the increment value (or decrement value) relating to the magnification rate is applied to the process for increasing the count number N by the counter 505, so that the control is simplified.

If the user continues to press the up key 394 (or the down key 395) after the count number N is reset, then the calculation portion 503 carries out addition (or subtraction) with respect to the magnification rate, by using an increased increment value (or decrement value) (in other words, an increment value or decrement value of "10%").

After the step S111 in FIG. 6 is executed, a step S112 is carried out. In the step S112, the count monitor 506 outputs a notification signal for notifying an increase in the increment value (or decrement value) to the change instruction portion 508. The change instruction portion 508 outputs a reset signal to the reception portion 501 on the basis of the notification signal from the count monitor 506. The reception portion 501 changes the colour of the up key 394 (or the down key 395) from "red" to "yellow", on the basis of the reset signal from the change instruction portion 508.

As described above, the calculation portion 503 sequentially adds a magnification rate of "1%" progressively until the number of additions (or the number of subtractions) performed by the calculation portion 503 reaches the first threshold value. As a result, a magnification rate of "110%" is displayed in the display window 392, as shown in FIG. 10. In this case, the colour of the up key 394 returns to "yellow", as described above. The timing of the change in the increment value (or decrement value) of the magnification rate value displayed in the display window 392 is transmitted visually to the user by means of the colour change of the up key 394 or the down key 395.

In the step S110 in FIG. 6, the count monitor 506 outputs not only to the calculation portion 503 but also to the second determination portion 507, a notification signal to notify that the count number N of the counter 505 matches the first count threshold value. When the steps S111 and S112 after the step S110 is executed as described above, the second determination portion 507 sends a reset signal to the first determination portion 504 on the basis of the notification signal from the count monitor 506 in the step S108. The first determination portion 504 resets the measurement value of the timer on the basis of the reset signal. Thereafter, the timer measures the elapsed time after the reset of the measurement value.

Figure 11:
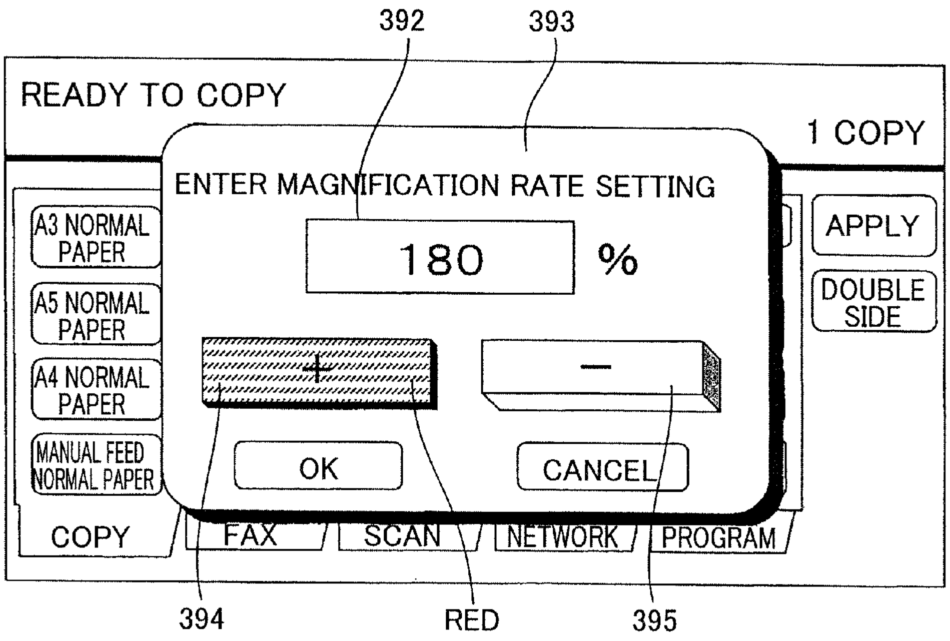
FIG. 11 is a plan diagram showing a schematic view of a subsequent display screen of the touch panel shown in FIG. 10.

FIG. 11 shows the pop-up image 393 in a case where the user continues to press the up key 394 after the calculation portion 503 switches the increment value from "1%" to "10%". The operation of the operating unit 103 is described further here with reference to FIG. 5, FIG. 6, FIG. 10 and FIG. 11.

As described above, the timer of the first determination portion 504 is reset after the colour of the up button 394 is returned to yellow. Thereafter, the routine from the step S103 to the step S108 shown in FIG. 6 is repeated. Meanwhile, the calculation portion 503 performs addition of the set value using the increased increment value of "10%". Therefore, the magnification rate displayed in the display window 392 switches sequentially from "110%" to "120%", "130%", "140%", "150%", "160%", "170%", "180%".

As shown in FIG. 11, after the routine specified in the step S103 to step S108 for calculation using the increment value of "10%" is performed six times (in this case, the display window 392 displays a magnification rate of "170%"), the calculation portion 503 adds a further "10%". As a result, a magnification rate of "180%" is displayed in the display window 392. When the routine specified in the step S103 to the step S108 for calculation with the increment value of "10%" is carried out six times, then the count number N of the counter 505 is 6. Furthermore, the count number N of the counter 505 when a magnification rate of "180%" is displayed in the display window 392 is 7.

In this case, in the step S107 in FIG. 6 as described above, the second determination portion 507 determines that the count number N of the counter 505 is equal to the second count threshold value. As a result of this, the step S109 is carried out and the colour of the up key 394 changes again from "yellow" to "red". Consequently, the user may recognize that the change in the magnification rate displayed in the display window 392 is to be performed using an even larger increment value (in the present embodiment, an increment value of "100%"). As described above, in the present embodiment, the user aims to set the multi-functional peripheral 100 to a magnification rate of "200%", and therefore the user may remove his or her hand from the up key 394 (in other words, release the up key 394), in accordance with the change in colour of the up key 394. When the user releases his or her hand from the up key 394, the detection portion 502 detects the release of the press to output a release signal to the first determination portion 504.

In the step S103 in FIG. 6, the first determination portion 504 determines that the press is released, on the basis of the release signal from the detection portion 502. As a result of this, the step S113 is carried out as described above.

In the step S113, the first determination portion 504 outputs a reset signal to the calculation portion 503 on the basis of the release signal from the detection portion 502. The calculation portion 503 returns the increment value "10%" used to calculate the magnification rate, to a default value of "1%", on the basis of the reset signal from the first determination portion 504. As a result of this, the step S114 is executed.

In the step S114, the first determination portion 504 outputs a reset signal to the reception portion 501 on the basis of the release signal from the detection portion 502. The reception portion 501 changes the colour of the up key 394 from "yellow" to "white", on the basis of the reset signal from the first determination portion 504.

The user then repeats pressing and releasing of the up key 394 for a shorter time interval (a time interval that does not exceed the threshold value stored in the memory element of the first determination portion 504), and thereby sets the magnification rate shown in the display window 392 to "200%". Meanwhile, the calculation portion 503 progressively increases the set value of "180%" displayed in the display window 392, using an increment value of "1%". When the user is increasing the set value from "180%" to "200%", the routine specified in the steps S101, S102, S103, S113 and S114 in FIG. 6 is repeated 20 times.

As described above, the user may continuously press the up key 394 after releasing the up key 394. In this case, if the magnification rate displayed in the display window 392 is "188%", then the colour of the up key 394 changes from "yellow" to "red". The user may release the up key 394 again in accordance with the change in colour of the up key 394. Furthermore, the user may then continuously press the up key 394. If the magnification rate displayed in the display window 392 is "196%", then the colour of the up key 394 changes from "yellow" to "red". The user may release the up key 394 again in accordance with the change in colour of the up key 394. Therefore, the user may repeat the pressing and releasing of the up key 394 four times at a shorter time interval (a time interval which does not exceed the threshold value stored in the memory element of the first determination portion 504). As a result of this, the user may set the magnification rate of the multi-functional peripheral 100 to "200%".

In this way, the user may release the up key 394 (or the down key 395) appropriately before the increment value (or the decrement value) used by the calculation portion 503 is increased, on the basis of the colour change of the up key 394 from "yellow" to "red". Therefore, it may be possible for the user to adjust the magnification rate without any unnecessary increase in the increment value to be applied to the set value.

Figure 12A:
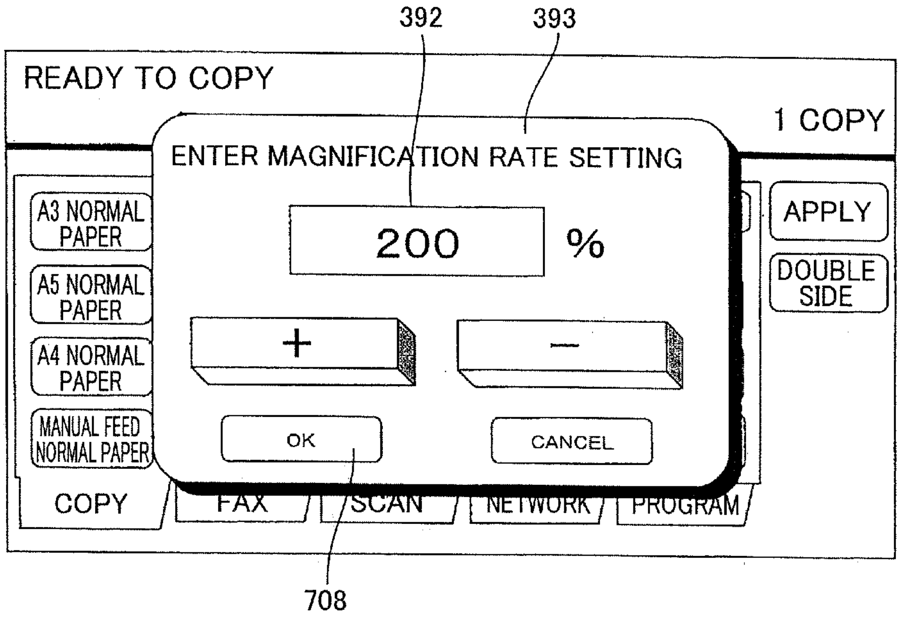
FIG. 12A is a plan diagram showing a schematic view of a subsequent display screen of the touch panel shown in FIG. 11.
Figure 12B:
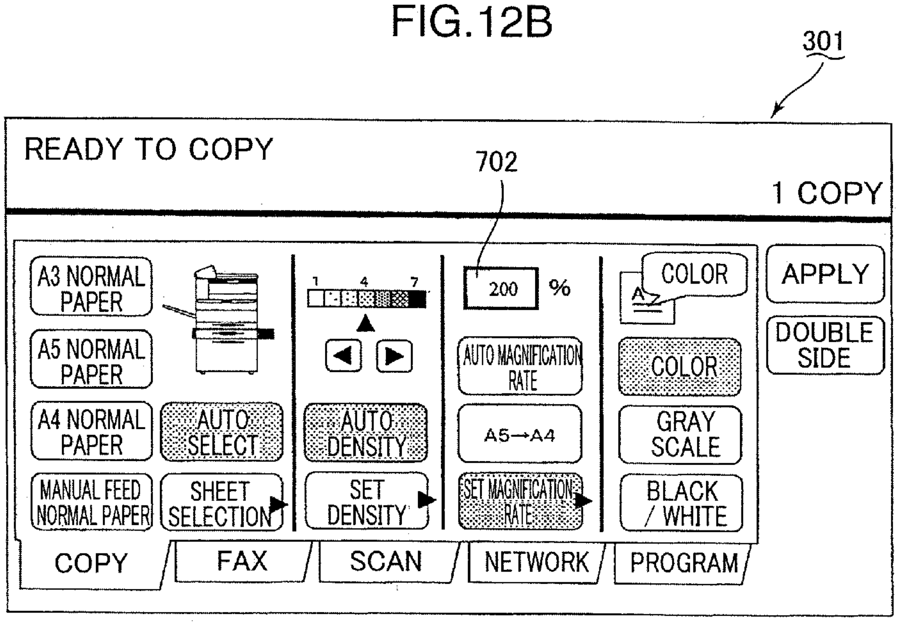
FIG. 12B is a plan diagram showing a schematic view of a subsequent display screen of the touch panel shown in FIG. 12A.

FIG. 12A shows the pop-up image 393 indicating that a magnification rate of "200%" is set by means of the operations described above. FIG. 12B shows the touch panel 301 after the user presses the OK key 708 on the pop-up image 393 shown in FIG. 12A. The operation of the operating unit 103 is described further with reference to FIG. 1, FIG. 2, FIG. 3, FIG. 5, FIG. 12A and FIG. 12B.

As described above, the user may press the OK key 708 displayed on the pop-up image 393 after the magnification rate is set to "200%". The detection portion 502 after detecting the press of the OK key 708 outputs a deletion signal to the reception portion 501. The reception portion 501 deletes the pop-up image 393 on the basis of the deletion signal from the detection portion 502. The display window 702 of the touch panel 301 after the deletion of the pop-up image 393 displays a magnification rate of "200%" which was shown in the display window 392 in the pop-up image 393. The user then presses the start key 305. The pressed start key 305 outputs a start signal to the reception portion 501.

The reception portion 501 outputs a read signal to the image reader 111 (and the feeder 106) on the basis of the start signal from the start key 305. The read signal includes a reading start instruction and information relating to the set magnification rate ("200%"). The image reader 111 starts reading of an image of the document D on the document platform 101 on the basis of the read signal.

As described in the context of FIG. 2, the image data read in by the image reader 111 is stored in the storage memory 120B, together with data relating to the magnification rate set via the touch panel 301. Thereupon, the image formation unit 121 forms an image on the basis of the image data and magnification rate data stored in the storage memory 120B. Therefore, the user may obtain an image magnified to "200%".

In the present embodiment, the first determination portion 504 increases the increment value or decrement value used for the calculation by the calculation portion 503, using the first count threshold value. The calculation portion 503 increases the increment value or the decrement value from "1" to "10" or from "10" to "100". Alternatively, the calculation portion 503 may increase the increment value or the decrement value, using other numerical values. For example, the calculation portion 503 may increase the increment value or the decrement value from "1" to "30", "1" to "50" and "10" to "20".

In the present embodiment, the second determination portion 507 specifies the timing of colour change of the up key 394 or the down key 395 by using a second count threshold value smaller than the first count threshold value. As described above, when the number of the addition or subtraction operations performed by the calculation portion 503 reaches the number specified by the second count threshold value, then the colour of the up key 394 or the down key 395 is changed.

As a result of this, the colour of the up key 394 or the down key 395 changes from "yellow" to "red" before the calculation portion 503 increases the increment value or the decrement value. Therefore, the user may visually perceive the timing at which the numerical value displayed on the display window 392 is to change using a larger variable range. If the user wants to change the set value using a larger variable range, then the user may continue to press the up key 394 or the down key 395. If the user does not want to change the set value with a larger variable range, then the user may release the up key 394 or the down key 395. Consequently, the user may change the set value to a desired value without making the set value unnecessarily large or small, which results in dramatically efficient inputting operation for numeric values.

In the present embodiment, the user adjusts the magnification rate by operating the up key 394. The principles described above are also applied similarly to the operation of the down key 395.

The principles of the operating unit 103 described above are especially suitable for application to an image forming apparatus. As described above, when an image of a document D of A4 size is to be enlarged to an image of B4 size, then the user may change the magnification rate of the image from "100%" to "122%", in accordance with the principles of the operating unit 103 described above. Furthermore, when an image of a document D of A4 size is to be reduced to an image of B5 size, then the user may change the magnification rate of the image from "100%" to "84%", in accordance with the principles of the operating unit 103 described above. As described above, the user is less likely to incorrectly operate the operating unit 103 because of the change in colour of the up key 394 or the down key 395. Consequently, the change in the magnification rate described above may be performed accurately and efficiently.

In the present embodiment, the operating unit 103 is used to change the magnification rate. Alternatively, the operating unit 103 may also be used to set various numerical values, such as setting the number of prints, setting the print density or setting the size of the sheet.

In the present embodiment, the first count threshold value is set to "9". Alternatively, the first count threshold value may be set to another numerical value. The first count threshold value may be set appropriately in accordance with, for example, the time length from the press of the up key 394 or the down key 395 until the start of a continuous addition or subtraction operation by the calculation portion 503, the magnitude of the increment value or the decrement value used by the calculation portion 503, or an amount of increase in the increment value or the decrement value used by the calculation portion 503.

In the present embodiment, the variable digit in the numerical value displayed in the display window 392 changes successively from the "ones place" to the "tens place" and to the "hundreds place" with the process of increasing the increment value or decrement value performed by the calculation portion 503. Alternatively, there does not have to be a shift in the variable digit associated with the process of increasing the increment value or the decrement value. For example, the calculation portion 503 may firstly increase the set value with an increment value of "1" and may then change the set value with an increment value of "2". In this case, a shift of variable digit does not occur. Furthermore, alternatively, it may be also possible to produce a shift in the variable digit, for example, from "ones place" to "hundreds place", in association with the process of increasing the increment value or the decrement value. For example, the calculation portion 503 may firstly increase the set value with an increment value of "1" and may then increase the set value with an increment value of "100".

As aforementioned, the second count threshold value is set to be a smaller value than the first count threshold value. In the present embodiment, the first count threshold value is set to "9", whereas the second count threshold value is set to a "7" value with corresponds to 78% of the first count threshold value. Alternatively, the second count threshold value may be set to another value smaller than the first count threshold value. Preferably, the second count threshold value is set to a value of 70% to 90% of the first count threshold value. As a result of this, the user may perceive in advance the timing at which the calculation portion 503 changes the increment value or the decrement value. The user may selectively use the increment value defined as a default setting and an increment value to be increased by the calculation portion 503, as appropriate, and so quickly change the numerical value to a desired set value.

If the second count threshold value is less than 70% of the first count threshold value, then the notification of the change in the increment value or the decrement value may occur too early. As a result of the user releasing the up key 394 or the down key 395 before the numerical value on the display window 392 sufficiently approaches the target value, the user then has to repeat the pressing of the up key 394 or the down key 395 more times.

If the second count threshold value is greater than 90% of the first count threshold value, then the notification of the change in the increment value or the decrement value may occur too late. The set value changes using an increased increment value or decrement value by the calculation portion 503 before the user releases the up key 394 or the down key 395 after perceiving the colour change of the up key 394 or the down key 395, and therefore the user is required to correct the set value subsequently.

As described above, the detection portion 502 detects the press of the up key 394 or the down key 395, and the first determination portion 504 subsequently measures the pressing period of the up key 394 or the down key 395. The elements such as the calculation portion 503, the count monitor 506, the counter 505, the second determination portion 507 and the change instruction portion 508 execute the step S102 to the step S114 shown in FIG. 6. Alternatively, the step S102 to the step S114 shown in FIG. 6 may be executed by using other elements. For example, the detection portion 502 may also detect the press of the up key 310 and the down key 311, which are push buttons, as described in the context of FIG. 3. Thereupon, the first determination portion 504, the calculation portion 503, the count monitor 506, the counter 505, the second determination portion 507 and the change instruction portion 508 may also execute the step S102 to the step S114. The push button type of the up key 310 and the down key 311 may also incorporate "yellow" and "red" light sources, for example. The detection portion 502 and/or the reception portion 501 may also light up the "yellow" light source incorporated into the up key 310 or the down key 311, when the up key 310 or the down key 311 is pressed. Thereupon, the reception portion 501 may also light up the "red" light source incorporated into the up key 310 or the down key 311, when the calculation portion 503 increases the increment value or the decrement value.

In the present embodiment, the second determination portion 507, the change instruction portion 508 and the reception portion 501 change the colour of the pressed up key 394 or the pressed down key 395, when the number of calculations performed by the calculation portion 503 matches the second count threshold value. As described above, the colour change of the pressed up key 394 or the pressed down key 395 notifies the user of the timing of the change in the increment value or the decrement value used in the calculation performed by the calculation portion 503. Additionally, it may be also possible to use a warning element configured to generate a warning sound or a warning message in order to notify the user of the timing of change in the increment value or decrement value used in the calculation performed by the calculation portion 503. The warning element may also generate a voice message such as "Changing set value faster". Alternatively, the warning element may also display a text message such as "Changing set value faster" on the touch panel 301.

In the present embodiment, the principle for changing a numerical value is used to change the print magnification rate. Alternatively, the principle for changing a numerical value described above may also be employed to change another set value. For example, if the operating unit 103 described above is incorporated into an image forming apparatus, the principle for changing a numerical value may be applied suitably to the setting of the sheet dimensions or print density.

In the present embodiment, the unit of the set value is displayed using "%". The unit of the set value is specified appropriately in accordance with the corresponding setting parameter. For example, if the principle for changing a numerical value described above is applied to setting a number of print copies, then the unit of the set value may be "page".

In the present embodiment, the principle for changing a numerical value described above is achieved by various elements incorporated into the multi-functional peripheral 100 and the operating unit 103. Alternatively, the functions of the various elements described above may also be achieved by a program stored in a memory element. For example, the program may also be stored on a CD-ROM, which may be separate from the image forming apparatus. The program on the CD-ROM is installed in the image forming apparatus as necessary. Alternatively, a program may be stored in the ROM 402, RAM 403 and/or the HDD 404 described in the context of FIG. 4.

The input apparatus according to an aspect of the embodiment described above comprises: an operating key configured to be pressed; a detector configured to detect press of the operating key; a calculation portion configured to sequentially add or subtract a first variable to or from a set value during the press of the operation key and sequentially add or subtract a second variable greater than the first variable to or from a set value after a number of calculations with the first variable exceeds a first threshold number; and a change portion configured to change the operation key in colour from a first hue to a second hue, when the number of the calculations with the first variable exceeds a second threshold number smaller than the first threshold number.

According to the configuration described above, a user may press the operating key. The detector detects the press of the operating key. During the press of the operating key, the calculation portion sequentially adds or subtracts the first variable to the set value a specific times defined by the first threshold number. After the number of the calculations with the first variable exceeds the first threshold number, the calculation portion sequentially adds or subtracts a second variable greater than the first variable to or from the set value. Consequently, the user may continuously press the operating key to change the set value greatly. When the number of calculations with the first variable exceeds the second threshold number, the change portion changes the operating key in colour from the first hue to the second hue. As a result of this, information indicating completion of the second threshold number of the calculation with the first variable is visually transmitted to the user. Therefore, the user who does not want to adjust the set value with a larger variable may release the operating key in accordance with the hue change of the operating key. A user who wants to adjust the set value using a larger variable may continuously press the operating key to efficiently adjust the set value to a target value with a larger variable.

In the configuration described above, preferably, the second threshold number is ranged between 70% and 90% of the first threshold number.

According to the configuration described above, information indicating the completion of the second threshold number of the calculation with the first variable is visually transmitted to the user at a suitable timing. Therefore, a user who does not want to adjust the set value using a larger variable may release the operating key in accordance with the hue change of the operating key. A user who want to adjust the set value using a larger variable may continuously press the operating key to efficiently adjust the set value to a target value.

In the configuration described above, preferably, the change portion returns the second hue to the first hue, when the calculation portion starts calculation with the second variable.

According to the configuration described above, preferably, the change portion returns the second hue to the first hue, when the calculation portion starts the calculation with the second variable. As a result of this, information indicating initiation of the calculation with the second variable is visually transmitted to the user.

In the configuration described above, preferably, the calculation portion uses the first variable to change a first digit of the set value and uses the second value to change a second digit greater than the first digit.

According to the configuration described above, the calculation portion uses the first variable to change the first digit of the set value. Furthermore, the calculation portion uses the second variable to change the second digit greater than the first digit. Therefore, the user may continue to press the operating key after the calculation portion completes the first threshold number of the calculation to shift the digit of the set value to be changed. Furthermore, the change in the hue of the operating key visually transmits the timing of the digit shift of the variable to the user.

The image forming apparatus relating to another aspect of the embodiment described above comprises the input apparatus described above. Consequently, the image forming apparatus configured to change the set value continuously in an efficient manner in accordance with continuous press of the operating key is provided.

This application is based on Japanese Patent application serial No. 2009-250192 filed in Japan Patent Office on Oct. 30, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An input apparatus configured to sequentially change a set value, comprising:

an operating key configured to be pressed;

a detector configured to detect press of the operation key;

a calculation portion configured to sequentially add or subtract a first variable to or from the set value during the press of the operation key and sequentially add or subtract a second variable greater than the first variable to or from the set value after a number of calculations with the first variable exceeds a first threshold number;

a determination portion configured to determine whether the number of the calculations with the first variable exceeds a second threshold number smaller than the first threshold number, the determination portion including a memory element configured to store the second threshold number in advance; and a change portion configured to change the operating key in colour from a first hue to a second hue in response to a trigger signal that is output from the determination portion when the number of the calculations with the first variable exceeds the second threshold number.

2. The input apparatus according to claim 1, wherein:

the second threshold number is ranged between 70% and 90% of the first threshold number.

3. The input apparatus according to claim 1, wherein:

the change portion returns the second hue to the first hue when the calculation portion starts calculation with the second variable.

4. The input apparatus according to claim 1, wherein:

the calculation portion uses the first variable to change a first digit of the set value and uses the second variable to change a second digit greater than the first digit.

5. An image forming apparatus comprising the input apparatus according to claim 1.

6. The input apparatus according to claim 1, wherein the operating key changes color from the first hue to the second hue before the calculation portion starts calculating with the second variable.

7. The input apparatus according to claim 6, wherein the operating keys keep the color at the first hue before the number of the calculations with the first variable exceeds the second threshold number.

8. The input apparatus according to claim 1, wherein:

the determination portion includes a counter configured to count the number of calculations with the first variable.

* * * * *